US006925060B2

(12) United States Patent
Mangin (10) Patent No.: US 6,925,060 B2
(45) Date of Patent: Aug. 2, 2005

(54) METHOD AND UNIT FOR CONTROLLING THE FLOW OF A TCP CONNECTION ON A FLOW CONTROLLED NETWORK

(75) Inventor: Christophe Mangin, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 789 days.

(21) Appl. No.: 09/770,215

(22) Filed: Jan. 29, 2001

(65) Prior Publication Data

US 2001/0017844 A1 Aug. 30, 2001

(30) Foreign Application Priority Data

Feb. 11, 2000 (FR) .............................. 00 01735

(51) Int. Cl.$^7$ ................................ H04J 12/28
(52) U.S. Cl. .................... 370/237; 370/231; 370/395.5
(58) Field of Search ................ 370/468, 328–330, 370/341, 349, 465, 477, 252, 331, 415–419, 428–429, 338, 401–403, 516–519; 709/217, 219, 230, 250

(56) References Cited

U.S. PATENT DOCUMENTS

| | | | | | |
|---|---|---|---|---|---|
| 6,115,750 | A | * | 9/2000 | Dillon et al. | 709/235 |
| 6,370,114 | B1 | * | 4/2002 | Gullicksen et al. | 370/229 |
| 6,563,787 | B1 | * | 5/2003 | Ramaswamy et al. | 370/229 |
| 6,564,267 | B1 | * | 5/2003 | Lindsay | 709/250 |
| 6,643,710 | B1 | * | 11/2003 | Thorne et al. | 709/250 |
| 6,646,985 | B1 | * | 11/2003 | Park et al. | 370/229 |
| 6,680,922 | B1 | * | 1/2004 | Jorgensen | 370/328 |
| 6,687,227 | B1 | * | 2/2004 | Li et al. | 370/231 |
| 6,697,378 | B1 | * | 2/2004 | Patel | 370/468 |
| 6,701,370 | B1 | * | 3/2004 | Dillon | 709/230 |

FOREIGN PATENT DOCUMENTS

WO    WO 99/35790    7/1999

OTHER PUBLICATIONS

Internetworking with TCP/IP, Principle, Protocols, and Architectures, vol. 1, Prentice Hall, 2000, pp. 209–234.*
Lampros Kalampoukas, et al., IEEE, pp. 242–251, "Explicit Window Adaptation: A Method to Enhance TCP Performance", Mar. 29, 1998.
A. Koike, Global Telecommunications Conference—Globecom'99, vol. 3, pp. 1921–1925, "Active TCP Control by a Network", 1999.

(Continued)

Primary Examiner—Kenneth Vanderpuye
Assistant Examiner—Van Kim T. Nguyen
(74) Attorney, Agent, or Firm—Oblon, Spivak, McClelland, Maier & Neustadt, P.C.

(57) ABSTRACT

The invention proposes a method and a unit for controlling the flow of at least one TCP connection between a sender and a receiver. The method is of the type which consists in controlling, at the level of a given multiplexing node through which TCP segments relevant to the connection pass, a window size parameter contained in acknowledgement segments sent back by the receiver. The method comprises the steps of:

a) receiving an acknowledgement from the receiver on the up link (receiver to sender) of the connection at the level of said given multiplexing node;

b) controlling a window size parameter contained in, said acknowledgement segment on the basis of the difference between, firstly, a first context value associated with the TCP connection, defined as being the sequence number of the last segment that was transmitted from said given multiplexing node on the down link (sender to receiver) of the connection, to which the length of said segment is added, and, secondly, the sequence number indicated in said acknowledgement segment;

c) transmitting the acknowledgement segment to the sender the up link of the connection from said multiplexing node with the window size parameter thus controlled.

19 Claims, 3 Drawing Sheets

OTHER PUBLICATIONS

Victor Chim, et al., IEEE, pp. 774–777, "End–to–End Acknowledgments for Indirect TCP Over Wireless Internetworks", Aug. 20, 1997.

Teruyuki Hasegawa, et al., IEEE, pp. 159–168, "Protocol Architecture of High Speed TCP/IP Service Over International ATM Networ", May 26, 1998.

Ramakrishna Satyavolu, et al.; ATM Forum Document No.: ATM_Forum/98–0152R1 "Explicit rate control of TCP applications"; pp. 1–20; Feb. 1998.

Paolo Narvaez et al.; "Acknowledgment Bucket Scheme for Regulating TCP Flow over ATM"; d'Arbeloff Laboratory for Inforamtion Systems and Technology Massachusetts Institute of Technology; pp. 1–21.

* cited by examiner

METHOD AND UNIT FOR CONTROLLING THE FLOW OF A TCP CONNECTION ON A FLOW CONTROLLED NETWORK

TECHNICAL FIELD

The present invention relates to a method and a unit for controlling the flow of a TCP connection, in particular a TCP connection established across a flow controlled network.

BACKGROUND OF THE INVENTION

The TCP protocol (Transmission Control Protocol), referred to hereafter as TCP, is a protocol of the transport layer in the TCP/IP layer. It is very widely used in networks and most widely used on the Internet network. It provides a transport service for application programmes in the upper layer in the form of two-way communications carrying a flow of octets between a sender and a receiver on which these programmes are run (this is known as end-to-end transmission). For example, the sender and the receiver may be a network server and a client final respectively. Some of the protocols supported by TCP are: FTP (File Transfer Protocol) used to transmit files, HTTP (Hyper Text Transfer Protocol) which handles transactions on the Internet network or SMTP (Simple Mail Protocol) for electronic mail.

Before transferring data, TCP establishes a connection between the sender and the receiver, referred to as a TCP connection, and sets up the error detection and correction mechanisms as well as a flow control mechanism and a congestion mechanism. It is for this reason that TCP is referred to as a connection-oriented (or connected mode) protocol, which, furthermore is reliable.

The connection consists in associating; a pair (IP address, TCP port) relating to the sender with a pair (IP address, TCP port) relating to the receiver in the two directions. The, IP addresses are provided by the IP layer whilst the TCP ports are local. TCP cuts up the flow of octets to be transmitted into segments, the maximum size of which is negotiated beforehand between the two ends of the TCP connection when the connection is opened. A segment is therefore the unit used by TCP protocol. Segments are exchanged in order to establish the connection (segment carrying the SYN flag), to transfer data, to acknowledge data (segment carrying the ACK flag), to shut down the connection (segment carrying the FIN segment) and to re-initialise the connection (segment carrying the RST flag).

The segments passing along the down link of the connection (from the sender to the receiver) or data segments contain a sequence number. This sequence number is inserted by the sender in a header of the data segment. It indicates the rank of the first element of data (in practice an octet) carried by the segment within the data stream transmitted on the down link of the TCP connection. A positive acknowledgement of the data is given by the acknowledgement segments (or acknowledgements) passing along the up link of the connection (from the receiver to the sender). The header of each acknowledgement segment contains a sequence number, inserted by the receiver. This sequence number indicates the rank of the data element or octet following the last data element or octet correctly received by the receiver within the data stream transmitted on the down link of the TCP connection, i.e. the rank of the next data element or octet expected by the latter.

The flow control mechanism enables the flow to be controlled end to end, i.e. between the two ends of the connection, without any assumptions as to the value of the flow between the different multiplexing nodes of the network. In order to improve efficiency in transmitting data streams, this mechanism is based on a sliding window system. The congestion control, in turn, acts on the size of this window on the basis of information from the flow control, enabling the level of congestion on the network to be estimated. One of the main features of the TCP flow control mechanism is that it does not use any explicit information about the status of the network supplied by the latter. A fortiori, the congestion control mechanism determines the state of congestion on the network on the basis of implicit signals supplied by the flow control, such as the arrival of acknowledgements, the elapse of time-outs or the reception of duplicated acknowledgements.

The implications of the and/or congestion control mechanisms on the performance of TCP in the context of pure datagram networks such as IP (Internet Protocol) and ATM networks (Asynchronous Transfer Mode) are currently the subject of research which has already led to proposals of ways in which these mechanisms can be modified. The purpose of this research is primarily to improve the use the network and enable resources to be shared fairly between the different TCP connections. The invention relates to this field of research work and concerns more specifically the flow control techniques applied to TCP connections.

Figure 1:
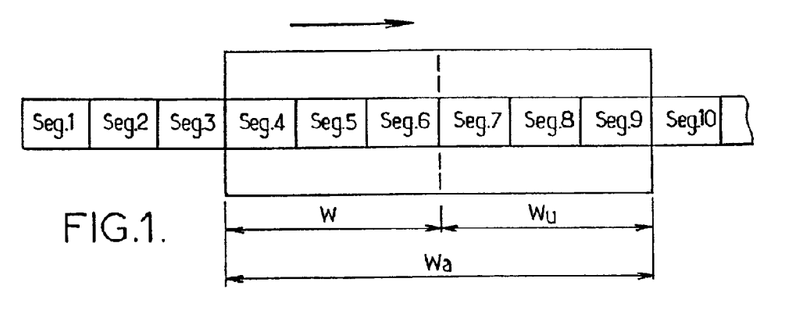
FIG. 1, already discussed: is a diagram illustrating the sliding window principle of the TCP flow control mechanism.

TCP flow control is based a sliding window mechanism. The window W, expressed as a number of octets, is the volume of information which the sender has transmitted without having received an acknowledgement from the receiver. The window principle enables TCP to anticipate the reception of a segment by the receiver, i.e. of sending segments into the window without waiting for the acknowledgement. This window is referred to as an anticipation window or transmission window or this reason. The size of the window W is modulated by the congestion control and remains below a maximum value fixed by the receiver and notified in each acknowledgement segment. To this end, each acknowledgement segment contains a parameter denoting the window size WA, the value of corresponds to said maximum value. The way in which this mechanism is illustrated by the diagram of FIG. 1. Data segments are denoted by references Seg. 1 to Seg. 11. The direction in which the data segments are transferred from the sender to the receiver is shown by an arrow. As may be seen, the TCP sliding window mechanism operates on the basis of octets and not on segments but the segment is the unit of TCP protocol for all practical purposes and it is convenient to refer to data expressed as a number of segments here. The maximum value of the size of the window Wa issue by the receiver in an acknowledgement determines an available window which, in combination with the value of the sequence number contained in the acknowledgement segment spans segments Seg. 4 to Seg. 9, example. In this example, the sequence number contained in the acknowledgement indicates that the receiver has already received and acknowledged the segments up to segment 3 inclusive. The value of the parameter Wa gives an indication of the space available in an input buffer memory of the receiver, since it corresponds to the volume of data which the receiver declares it is ready to accept. The sender calculates the usable window Wu defined by Wu=Wa−W and which represents the additional number of octets which it can transmit without waiting for acknowledgement of the segments Seg. 4 to Seg. 6 already transmitted but not yet acknowledged. In the example illustrated here, this usable window Wu spans the segments Seg. 7 to Seg. 9. The sender can therefore transmit these segment is without waiting.

Figure 2:
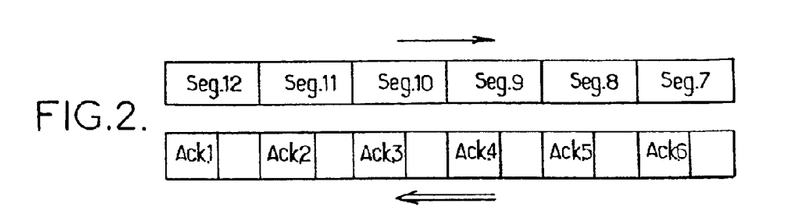
FIG. 2, also discussed above: is a diagram illustrating how segments and acknowledgements are transferred across the network.

If we consider a network with no buffer memory and made up solely of transmission channels characterised by a transmission rate and a transfer time, the only memory capacity available in the network to absorb the window of a TCP connection will be the equivalent memory of the transmission channel. For a given TCP connection, the size of the window W corresponds to the quantity of data sent on the network and not yet acknowledged. In physical terms, the data contained in the network at any given time consists on the one hand of segments being transferred on the down link of the connection and on the other the acknowledgements being sent on the up link of the connection and relating to the segments already processed by the receiver. FIG. 2 illustrates an example in which the channel is capable of absorbing a window corresponding to 12 segments. On this network in this example, at a given instant, segments Seg. 7 to Seg. 12 are in the process of being transmitted on the down link (symbolised by the single arrow) on the one hand and acknowledgements Ack 1 to Ack 6 are in the process of being transmitted on the up link (symbolised by the double arrow) on the other. Since reception of a segment prompts an acknowledgement on the part of the receiver, the latter are spaced apart on the up link by a distance equivalent to the time taken to transmit a segment on the down link.

If the transmission rate and time are equal on both links, the size of the window W which should be reached as a maximum for a TCP connection is expressed by the following equation:

$$W\max = d \times RTT \tag{1}$$

where Wmax is the maxim size of the window (expressed in octets), d is the transmission rate of the connection (expressed in octets per second) and RTT (Round-Trip Time) the transfer time there and back of the data on the transmission channel or the loop time (expressed in seconds). The product RTT is also referred to as the passband-transfer time product. Equation (1) highlights the link between TCP performance in terms of the transmission rate of the connection and the maximum window size which may be used by this connection.

TCP congestion control is based exclusively on mechanisms which detect lost segments and modulate the window size W accordingly.

The segment loss detection mechanisms are based firstly on the elapse of a timed transmission period and secondly on anticipated detection. Whenever a segment is retransmission time-out (RTO) is activated at the transmitter end. If the time-out expires before the corresponding acknowledgement, has been received, TCP regards the segment as lost and proceeds to retransmit it, activating a new retransmission time-out longer than the first. In addition, TCP may also assume, in anticipation, that a segment is lost, i.e. before the retransmission time-out associated with said segment has elapsed. This anticipated segment loss detection makes use of the fact that an acknowledgement is systematically generated for each segment received and that it bears the sequence number of the next anticipated segment the next in the sequence of segments). In keeping with this principle, a receiver might be prompted to issue acknowledgements bearing identical sequence numbers (corresponding to the last segment received in the sequence of segments) if a series of segments arrives in a different or er. Such acknowledgements (referred to as duplicated acknowledgements) a e a means of informing the sender that the segments have been received correctly, with the exception of one or more segments received in a sequence other than that in which they were sent or not received at all, and of advising the sequence number of the segment effectively expected. From the of view of the sender, the duplicated acknowledgements may be attributed to various problems on the network: the fact that the network has re-arranged the segments, that it has duplicated acknowledgements or finally that segment has been lost. In the latter case, all the segments following the segment assumed to have been lost will generate a duplicated acknowledgement. A TCP sender uses four different algorithms to modulate the size of its window. These algorithms are known as: slow start, congestion avoidance, fast transmit and fast recovery. first two are used either during the start of the data transfer immediately after establishing a connection, or following the loss of a segment detected by a pity of its retransmit time-out. The main purpose of the slow start algorithm is to impose a reduction on the size of the window W to a single segment then increase it by one segment for each acknowledgement received up to a threshold (referred to as the slow start threshold or "ssthresh"), from which point it is increased by only a fraction of a segment (equal to the size of a segment divided by the current size of the window) for each acknowledgement received. This second phase of increase takes place on the basis the congestion avoidance algorithm up to the point at which the window W teaches the limit notified by the receiver (window size Wa issued in each acknowledgement). Typically, the "ssthresh" is set to the maximum window size at the start of the transfer and half volume of data emitted and not yet acknowledged following a segment loss detected by expiry of the retransmission time. The fast transmit and fast recovery algorithms are used in the case of anticipated detection of a segment loss. In other words, they are triggered as a preventive measure when duplicate acknowledgements are received leading to the assumption that one or more segments has been lost. They have the effect of reducing the size of the window to half the volume of data transmitted and not yet acknowledged.

Although very robust, the TCP flow control and congestion mechanisms may lead to a deterioration in performance of the protocol. They therefore have various disadvantages. Firstly, a connection which is transmitting more data than others has a bigger window than others. Conversely, a connection using segments of a small size or which is subjected to longer transmission times occupies the resources available in the network less quickly. This results in an unfair distribution between the different TCP connections, transmission rate resources and network memory. Secondly, the end-to-end transmission time is poorly controlled. In effect, since no network resources have been allocated to the connection in advance and TCP does not work on the basis of explicit information about the status of the network, congestion points can arise, characterised by uncontrolled transfer times of traffic queues. Furthermore, the mechanism of detecting losses on the basis of expired retransmission time-outs and the retransmission of lost segments also has an uncontrolled effect in terms of transmission times. Thirdly, congestion is not detected until late on, precisely due to the implicit nature of this detection system, based as it is on detecting the loss of a segment. As a result, it is not possible to avoid the loss of segments and hence their retransmission. Fourthly, and this drawback results from the latter, the effective transmission rate is ineffectively used since the transmission rate and memory resources are used not only to transport the lost segments as far as the congestion point but also to retransmit them. This. phenomenon is further aggravated by what is referred to as the "go-back-N", retransmission strategy, used when a loss is detected on expiry of the retransmission time-out, which consists in retransmitting all the segments from the lost segment onwards. Finally and fifthly, the data flow is very irregular. Typically, until it reaches its maximum window size, TCP occupies an increasing amount of transmission rate and memory resources until they become saturated. The resultant loss of segments gives rise to cycles during, which the network is under-used) (caused by abrupt size reductions in the window size due to the slow start (land fast recovery algorithms), followed by another phase during which the size of the windows is increased, again followed by loss procedures, etc. From a qualitative point of view, these phenomena result in a waiting time which can be sustained to a greater or lesser degree when uploading tiles (usage by FTP) and a blockage of navigators when consulting intern et sites (usage by HTTP), etc.

Several ways of improving the behaviour and performance of TCP have been explored, both at the level of the transport layer (end mechanism) and of the network layer. Amongst these, FFR algorithms (fast retransmit/recovery) being the algorithms described above, the use of selective acknowledgement (SACK Selective ACKnowledgement) and explicit notification of congestion by adding a congestion indicator to the packets (ECN bit, Explicit Congestion Notification) have all been considered in relation to the transport layer. The purpose of FRR and SACK is to improve transmission rate, avoid expiry of retransmission time-outs and promote rapid recovery of resources following a segment loss. The ECN technique requires support from the network layer in Order to act on the transport layer (explicit indication of congestion supplied by the network) and is aimed at improving the fairness of resource distribution between the connections and shortening transfer times. Network layer mechanisms, such as systems whereby packets are discarded in anticipation (RED Random Early Discard), the use of transmission schedulers (WGQ, etc . . . ) and explicit techniques to control the transmission rate of TCP connections, enable performance to be enhanced in terms of transmission rate and a fairer distribution of network resources.

The mechanism of controlling the window size, which is the factor underlying the method proposed by the invention, may be attributed to this latter category, namely that of techniques intended to take explicit control of the transmission rate of TCP connections.

The transmission rate of a TCP connection may be controlled in several ways: either by controlling the rhythm at which segments are transmitted on the down link or by regulating the rate at which acknowledgements are transmitted on the up link. In effect, once the size of its window has been stabilised, a TCP transmitter normally receives an acknowledgement for each segment transmitted and is authorised to transmit a new data segment for each acknowledgement segment received without delay (re-generation of credits). In other words, the first solution consists in acting on the rate at which transmission credits are consumed by the sender and the second consists in acting on the rate at which they are re-generated. The second solution consists in increasing or reducing the spacing between acknowledgements and applying a spacing function to the acknowledgements, known as "Ack bucket". In order to obtain conformity to a given transmission rate, the firsts solution may consist in increasing or reducing the spacing between the transmission of segments. However, it may also be based on using a layer of a lower level supplying links whose transmission rate is definable and controllably. This is the case with an ATM or TDM network, for example. A flow control point is located at the interface of the ATM path, for example, within the equipment inter-connecting with the local network to which the sender is connected (source inter-connection equipment). In order to compensate for the differences in transmission rate between the local network and the ATM network, the source inter-connection equipment has a memory for holding a queue, provided in the form of a buffer memory. The data segments transmitted by the sender on the down link of the TCP connection pass through this buffer memory.

The flow control methods proposed by the invention consists of a mechanism for controlling the size of the transmission window of a TCP connection and is applied more specifically to a TCP connection established across a flow controlled networks. At least one flow control point co-operates with a queue through which they data segments transmitted by the sender pass on the down link of the connection. A flow-controlled ATM network would constitute such a network, for example, with a transfer capacity of the CBR (Constant Bit Rate), ABR (Available Bit Rate) or ABT (ATM Block Transfer) type, for example. Once the corresponding resource has been allocated within the network, an ATM path of this type enables the size of the buffer memories used in each multiplexing stage of the network to be limited and the loss on the path reduced to virtually zero. Since they do not encounter loss, TCP connections established across such an ATM path therefore increase their transmission window W to the maximum size Wa notified by the receiver. The memory capacity offered by the path is very limited (assuming a reasonable transmission rate and propagation time) and depends on the passband-transfer product. In effect, the volume V of data that can be absorbed by the network when transmitted at a liven rate D on a path characterised by a round trip transfer time T is given by the following equation:

$$V = D \times T \qquad (2).$$

So as to be absolutely clear, the volume V hereafter will be expressed as a number of segments, although in reality it is expressed as a number of bits, the transmission D rate being expressed in bits/second and the time T in seconds. Since the parameter T is an intrinsic parameter of the network, it is regarded as being constant for a given connection. Consequently, if D is selected such that V is less than the size of the window W of the TCP connection and if it is assumed that the core of the network does not contain a buffer memory, the following situations will be encountered:

if the segments are spaced, the surplus segments corresponding to the difference W−V will build up in the queue located at the flow control point,
  if the acknowledgements are spaced, a queue of acknowledgements corresponding to the segments constituting the surplus W−V will form at the level of the control point.

Figure 3:
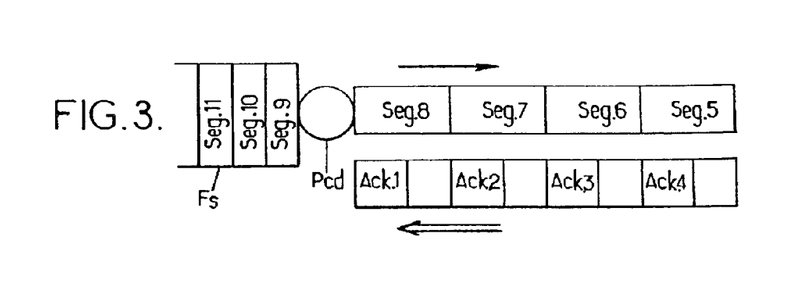
FIG. 3 and FIG. 4, also discussed above: are diagrams illustrating how a queue of segments and a queue of acknowledgements is built up in the case of flow control of a TCP connection by spacing the segments or by spacing the acknowledgements respectively.
Figure 4:
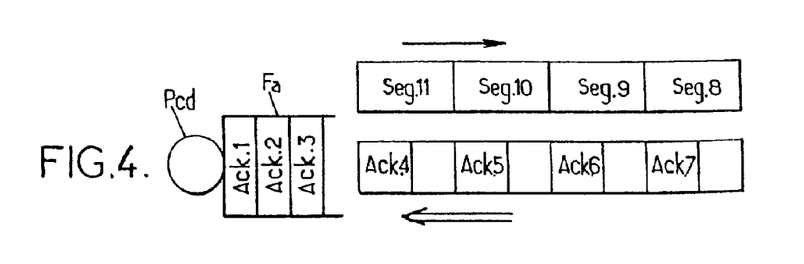

FIGS. 3 and 4, where elements shown in FIG. 2 are denoted by the same reference numbers, illustrate these two situations respectively in the context of an example in which W=11 segments and V=8 segments. In FIG. 3, the equivalent memory of the network contains the segments Seg.5 to Seg.8 in the process of being transmitted on the down link and the acknowledgements Ack. 1 to Ack.4 in the process of being transferred on the up link. The surplus data segments, namely segments Seg.9 to Seg. 11 form a queue Fs stored in a buffer memory upstream of the flow control point Pcd in the direction of the down link. In FIG. 4, the equivalent memory of the network contains segments Seg.8 to Seg. 11 in the process of being transferred on the down link and the acknowledgements Ack.4 to Ack.7 in the process of being transmitted on the up link. The surplus acknowledgements, namely the acknowledgements Ack. 1 to Ack.3 form a queue Fa stored in a buffer memory, upstream of the flow control point Pcd in the direction of the up link.

In the first of these instances (FIG. 3), the data segments of the transmission windows of each TCP connection are therefore located for the most part in respective queues at the interface with the ATM network, at the point where TCP flows are multiplexed in the virtual path, i.e. in a memory of the router securing the inter-connection between the local network and the ATM network. They may therefore occupy a memory space of up to several tens of kilobytes per connection (depending on the version of TCP used) and therefore risk causing congestion.

In the prior art, a means of preventing these queues from forming has already been proposed and consists in limiting the size of the window Wu which may be used by the sender by modifying, in the acknowledgement segments, the value of the window size parameter Wa inserted by the receiver. These techniques have been the subject of various studies, amongst which mention may be made of the article by L. Kalampoukas, A. Varma and K.K. Ramakrishnan, "Explicit Window Adaptation: A Method to Enhance TCP Performance", Proceedings of INFOCOM'98, April 1998, which, in the context of the first of the solutions described above, proposes a principle based on an algorithm to manage the buffer memory enabling the window size of the TCP connection to be determined immediately without needing to know the transmission rate. The article by R. Satyavolu, K. Duvedi and S. Kalyanaraman entitled "Explicit Rate Control of TCP Applications", ATM Forum/98-015281, February 198, describes a mechanism for translating a rate value into a window size value based on one of the rate allocation algorithms developed for handling the ATM ABR transfer capacity. The article by P. Narvaez and K.-Y. Siu, "An Acknowledgement Bucket Scheme for Regulating TCP Flow Control with ACR Information" ATM Forum/97-0758, September 1997, also suggests the use of an Ack bucket. Furthermore, international patent application WO 99135790 describes a method and a device for optimising the flow of a TCP connection across a flow controlled ATM network with a transfer capacity of the ABR type, which consists in controlling the window size parameter contained in the acknowledgement segments returned by the receiver depending on the rate available in the ATM network and the space available in the buffer memory: the connection queue. With this method, however, it is necessary to take account of information relating to the available rate in the ABR/ATM protocol layer.

SUMMARY OF THE INVENTION

The objective of the invention is to propose an alternative to the known methods of flow control on a TCP connection, in particular a connection established across a flow controlled network, which is simpler and therefore easier to implement.

This objective is achieved due to a method of controlling the flow of at least one TCP connection between a sender and a receiver, of the type which consists in controlling, at the level of a given multiplexing node across which the TCP segments pertaining to the connection pass, a parameter for the window size contained in the acknowledgement segments returned by the receiver, wherein the method comprises the steps of:

a) receiving an acknowledgement from the receiver on the up link (receiver to sender) of the connection at the level of said given multiplexing node;

b) controlling a window size parameter contained in said acknowledgement segment on the basis of the difference between, firstly, a first context value associated with the TCP connection, defined as being the sequence number of the last segment that was transmitted from said given multiplexing node on the down link (sender to receiver) of the connection, to which the length of said segment is added and, secondly, the sequence number indicated in the acknowledgement segment;

c) transmitting the acknowledgement segment to the sender on the up link of the connection from said multiplexing node with the window size parameter thus controlled.

In particular, the TCP connection is established across a flow controlled network 30. This being the case, the given multiplexing mode is preferably a flow control point of the flow controlled network. Since the flow control point co-operates with a memory which may hold a queue associated with the connection through which data segments transmitted by the sender on the down link of the connection pass, step c) may consist in controlling, on the basis of said difference, the window size parameter present in said acknowledgement segment so as to keep the volume of data stored in the queue below a second context value associated with the TCP connection. By preference, the given multiplexing node is located as close as possible to the sender, for example at the interface between the local network to which the sender is connected and the flow controlled network. In one example, this will be the case in particular if this given multiplexing node is also a flow control point of the flow controlled network.

The mechanism for controlling the size of transmission windows proposed by the invention prevents any congestion at the level of the flow control point of a flow controlled network in terms of flow by limiting the window size of each TCP connection so that the size of the queue for a connection forming on a level with the flow control point does not exceed a given threshold value which is equal to the second context value. However, it allows the transmission rate offered to the TCP connections by the flow controlled network to be varied. Another advantage of this mechanism is that it is compatible with the congestion control algorithms mentioned in the introduction, which act on the size of the notified window as defined in the acknowledgement segments on transmission by the receiver. The mechanism for controlling the notified window size takes precedence over these known congestion control mechanisms.

The invention also proposes a flow control unit for at least one TCP connection between a sender and a receiver, which comprises:

means for receiving TCP data segments arriving from the sender and transmitting them to the receiver on the down link (sender to receiver) of the TCP connection and for determining, on the basis of each data segment thus transmitted, a first quantity indicative of the rank, within a data stream transmitted on the down link of the TCP connection, of a first data element to be transmitted to the receiver in a next data segment;

means for receiving TCP acknowledgement segments from the receiver and transmitting them to the sender on the up link (receiver to sender) of the TCP connection and for extracting from each TCP acknowledgement segment received a second quantity indicative of the rank, within said data stream, of a next data element anticipated by the receiver;

regulating means for controlling, on the basis of the difference between said first quantity and said second quantity, a window size parameter (Wa) contained in said TCP acknowledgement segment received before transmitting said TCP acknowledgement segment to the sender.

Using the vocabulary specific to TCP, said first quantity corresponds to the sequence number contained in the data segment, to which the length (in octets) of the data field of this segment is added, and said second quantity corresponds to the sequence number contained in the TCP acknowledgement segment.

In one example, the flow control unit additionally has a memory for holding a queue of data segments received from the sender and to be transmitted to the receiver on the down link of the TCP connection across a flow controlled network, and the control applied by the regulating means to said window size parameter involves limiting said parameter to a value at most equal to the sum of said difference and a maximum size set for the queue in the memory. This maximum size corresponds to the second context value associated with the TCP connection mentioned above.

The invention also proposes equipment for providing an interconnection between a first network, for example a local network, and a second network, for example a flow controlled network, which incorporates such a flow control unit.

BRIEF DESCRIPTION OF THE DRAWINGS

Other features and advantages of the invention will become clear from the description below. This is given purely by way of illustration and should be read in conjunction with the appended drawings, of which.

DETAILED DESCRIPTION OF THE INVENTION

Figure 5:
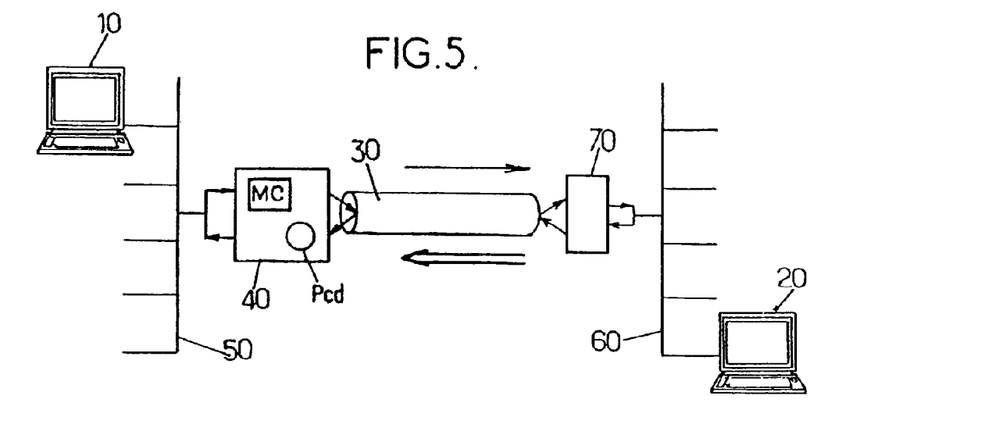
FIG. 5: is a diagram illustrating a TCP connection adapted to implementation of the method proposed by the invention.

FIG. 5 schematically illustrates an example of a TCP link on a flow controlled network adapted to implementation of the method proposed by the invention. The example relates to an application programme being run on a computer 10 (hereafter sender) which has to transmit data to an application programme being run on a remote computer 20 (hereafter receiver). These two application programmes use the TCP protocol to communicate. The sender 10 is connected to a local network 50, for example a high speed Ethernet network. A network of this type does not generate congestion because of the high speed available relative to the volume of data which it transmits. The receiver 20 is also connected to a local network 60. In one example, the local area network 60 is also assumed to be an Ethernet network but, of course, it may also be a different network, of the LAN type (Local Area Network), for example.

The TCP connection is made on a flow controlled network 30, for example an ATM network with a transfer capacity of the ABR type. The down link of the connection is shown by a single arrow whilst its up link is shown by a double arrow. Equipment 40 providing an inter-connection between the local network 50 and the network 30 is connected to the input of the network 30. This is a peripheral router. This equipment is the point at which the different TCP connections made on the network 30 are multiplexed. In one example, it is also the point at which flow control is applied to the network 30 on the down link and to this end has a flow control point Pcd. Finally, it is also the point at which the notified window size forming the basis of the flow control method of the TCP connection proposed by the invention is controlled. Equipment 70 providing an inter-connection between the network 30 and the network 60 is disposed at the output of the network 30 to provide the inverse demultiplexing function for the TOP segments. It is also a peripheral router.

In order to establish the connection, the sender 10 transmits a segment with a SYN flag on the down link and in return the receiver transmits a segment with an ACK flag on up link, optionally specifying in an option field the value MSS (Maximum Segment Size) of the maximum size of segments which it can receive depending on the characteristics of its buffer memory. The TCP connection is defined by a combination of the source port number and the destination port number, which identify respectively the application programme of the sender 10 and that of the receiver 20.

Figure 6:
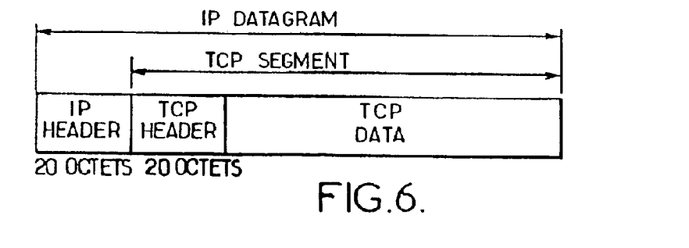
FIG. 6: shows the format of an IP datagram encapsulating a TCP segment.

TCP chops up the data stream to be transmitted encapsulating it in TCP segments, the size of which was determined when the connection was established, optionally taking account of the value MSS. Each TCP segment is in turn encapsulated in an IP datagram, within the router 40, in accordance with the format illustrated in FIG. 5. The TCP segment incorporates a TCP data block preceded by a TCP header, encoded over at least 20 octets. The IP datagram incorporates the TCP segment preceded by an IP header, also coded over 20 octets. FIG. 6 shows the format of the TCP header. It comprises:

a field containing the source port number and another for the destination port number, each of which is coded on 16 octets;

a field containing the sequence number (in the case of a data segment) and another for the acknowledgement sequence number (in the case of an acknowledgement segment), each of which is coded on 32 bits;

a field to indicate the length of the header (which is always a multiple of 32 bits), coded on four bits; this yield is necessary because the header may optionally contain one (or more) option field(s), each coded on 32 bits. An option field of this type may be used to indicate the value of the parameter MSS, mentioned above, if it is an ACK segment sent back by the receiver when the connection was established;

6 bits reserved for subsequent use and 6 bits designating respectively the value of URG, ACK, PSH, RST, SYN and FIN flags respectively. These flags are active at 1. The URG flag is used to indicate that at least some of the data octets in the segment must be transmitted as a matter of urgency. An urgency pointer, contained in another field of the header, then indicates which is the first of these octets which mist be transmitted urgently.

The ACK, RST, SYN and FIN flags were described above. Finally, the PSH flag indicates that the data was transmitted using what is known as a push operation, run by an application programme to produce immediate transmission of the data;

a "window size" field which will contain a window size parameter (Wa), coded on 16 bits; such a parameter Wa is included in each acknowledgement segment sent (back by the receiver on the up link of the connection; it enables the receiver to indicate to the sender the number of octets which it is able to accept;

a "checksum TCP DETAILED DESCRIPTION OF THE INVENTION field, indicating the result of a computed checksum, coded on 16 bits, which enables any transmission errors to be detected;

a field containing the above-mentioned urgency pointer, coded on 16 bits;

and, finally, the above-mentioned option field or fields.

As will be seen, the header format is identical for the segments transmitted by the sender and the acknowledgement segments transmitted by the receiver, the value of certain yields specific to one or the other only of these two segment types being irrelevant to the application programme of the receiver and sender respectively.

Figure 8:
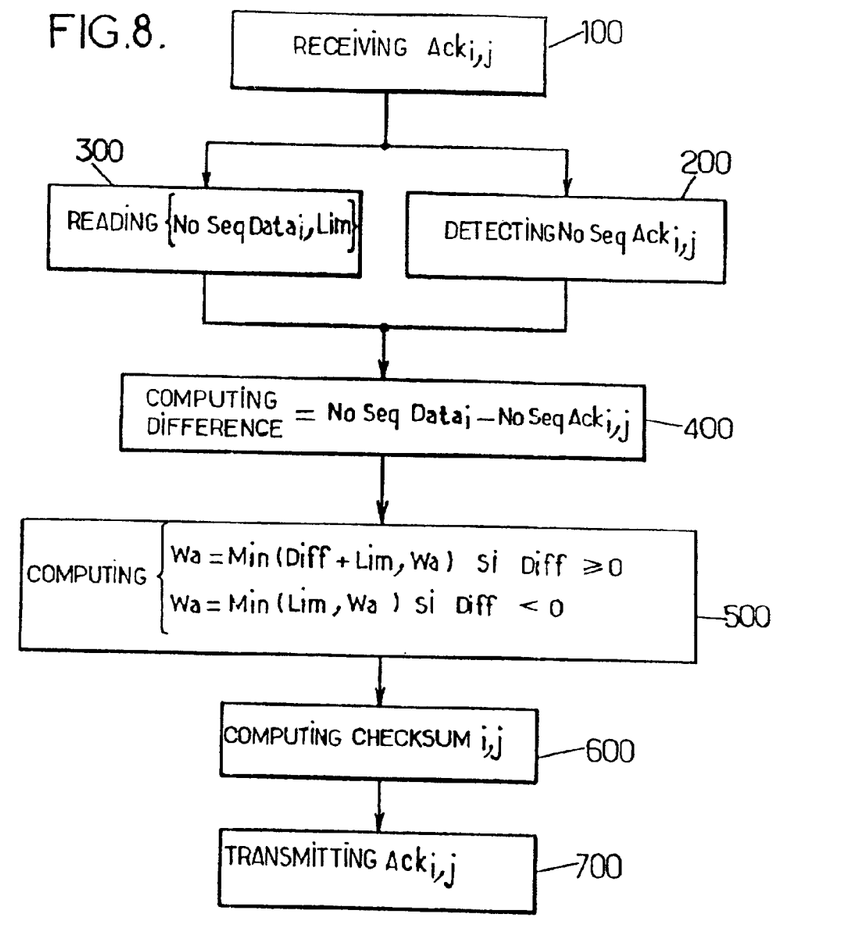
FIG. 8 and FIG. 9: are flow charts showing the steps of the method proposed by the invention.

A description will now be given of the steps proposed, by the method with reference to the flow chart given in FIG. 8. The first step 100 consists, for example, in receiving, at the level of the flow control point Pcd, an acknowledgement segment, shown by $Ack_{i,j}$ hereafter, which is the j-th acknowledgement sent by the receiver since the connection denoted by the index i was established, where i and j are whole numbers. This acknowledgement segment is therefore arriving on the up link of the connection shown by index i from the receiver.

In a step 200, the acknowledgement segment $Ack_{i,j}$ is de-encapsulated in order to detect the value of they sequence number $NoSeqAck_{ij}$ of $Ack_{i,j}$. In parallel, in a step 300, a connection context $\{NoSeqData_i, Lim\}$ is read from a context memory, to which we will return later. This context contains two context parameters or, values, which are associated with the connection.

The first context value $NoSeqData_i$ is defined as being the sequence number of the last segment which passed through the flow control point on the down link of the connection, to which is added the length of this segment, expressed as a umber of octets. By length of a data segment is meant, more specifically, the length of a data field of the segment, i.e. the total length of the segment less that of its header. This first context value therefore corresponds to the rank within the data stream transmitted on the down link of the TCP connection of a first data element or octet to be transmitted to the receiver in a next data segment. The way in which a context is generated and the way in which the first context value is updated will be explained later.

For the purposes of the invention, the second context value Lim corresponds to a maximum size set for the queue Fs in the buffer memory through which the segments transmitted by the sender on the down link of the connection pass. This value is constant throughout the duration of the connection. It is associated with the connection. In one example, it is determined when the TCP connection is established. In one implementing mode, it is the same for all the connections. However, in a preferred mode, it is determined on the basis of the maximum segment size parameter MSS associated with the connection. By preference, it is higher than the value of said maximum segment size parameter MSS, in order to avoid the "Silly Window" phenomenon. It should be pointed out that the value of this parameter is indicated, as is the base, by the receiver when the connection is initiated. The second context value Lim may also be dynamically generated depending on the memory space available for the queues of new TCP connections.

In a step 400, a control parameter Diff is computed, defined as being the difference between, firstly, the first context value $NoSeqData_i$ associated with the connection of index i, and, secondly, the sequence number $NoSeqAck_{ij}$ indicated in the acknowledgement segment $Ack_{ij}$. In other words, $Diff=NoSeqData_i-NoSeqAck_{ij}$. The positive values of the parameter Diff 15 constitute an estimate by excess of the volume Vdata of the data currently being transferred in the network on the down link of the connection of index i. It is an estimate by excess in the sense that the estimated value produced corresponds to the maximum volume which the network is in the process of absorbing on the down link at the instant at which this step is run. In effect, certain segments may have been sent to the receiver from the instant at which the latter transmitted the acknowledgement segment $Ack_{ij}$. Other segments may have been discarded or lost. Clearly, the parameter Diff is not representative of the data volume being transmitted in the network on the down link of the connection unless it is positive. In other examples, we will see that this is not necessarily the case because of the retransmit TCP segment mechanism.

A step 500 then consists in computing a modified value of a window size parameter Wa inserted by the receiver in the acknowledgement segment $Ack_{i,j}$. This step allows the notified size of the window to be amended within the acknowledgement segment on the basis of the parameter Diff generated during the preceding step i order to keep the size of the queue Fs below a set maximum size corresponding to tie second context value Lim associated with the connection of index i. It will be recalled that the value of this parameter Wa is contained in the "window size" field of the TCP segment. In one example, the window size parameter Wa is controlled on the basis of the following rule:

either $Wa=Min(Dio+Lim, WA)$ if $Diff \geq 0$ or $Wa=Min(Lim, Wa)$ if $Diff<0$ where Min is the minimum function.

In this manner, the vale of the window size parameter Wa is permanently limited to a value at most equal to the sum of the control parameter Diff and the second context value Lim.

In a step 600, the value contained in the "checksum TCP" field of the acknowledgement segment $Ack_{i,j}$ is recomputed and the "checksum TCP" field is modified accordingly so as to take account of the modification to the "window size" field containing the value of the window size parameter Wa. In a final step 700, the acknowledgement segment $Ack_{i,j}$, with a "window size" field and a "Checksum TCP" field optionally modified as proposed by the invention, is transmitted, preferably immediately, to the sender 10 so that it can be reset.

Steps 100 to 700 described above are run for each acknowledgement segment transmitted by the receiver 20 and passing through the flow control point Pcd on the up link of the TCP connection.

The computing step 400 is run at the level of the flow control point Pcd of the flow controlled network 30, i.e. also at the level of the queue Fs. Furthermore, the flow control point Pcd is preferably as close as possible to the sender 10.

Accordingly, the portion of the network located between the sender and the flow control point Pcd contains the least possible data. This being the case, the parameter Diff is as accurate an estimate as possible of the volume of data Vdata being transferred across the network on the down link of the connection. In a preferred example, the flow control point Pcd is located in the equipment 40 inter-connecting the local network 50 to which the sender 10 is connected and the flow controlled network 30.

Figure 7:
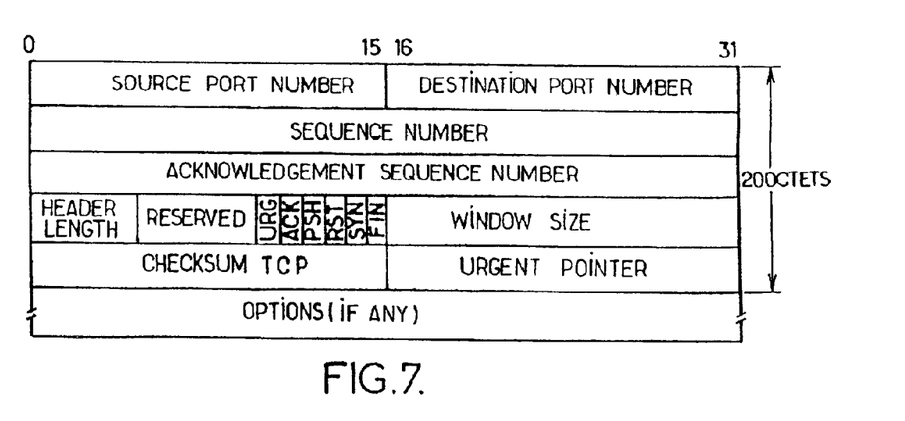
FIG. 7: is a detail of the header of a TCP segment.
Figure 9:
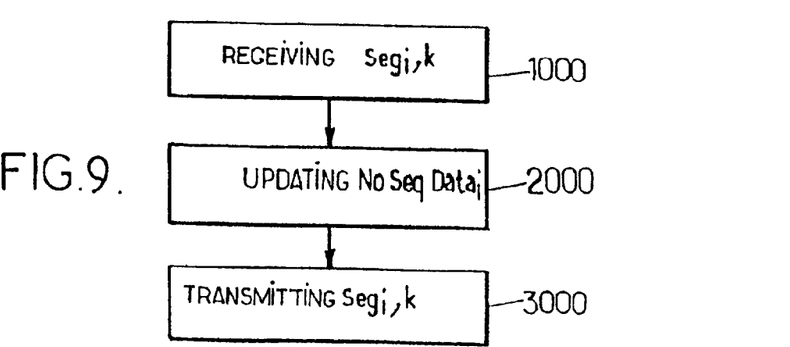

The inter-connecting equipment between the local network to which the sender is connected and the flow controlled network, such as the router 40 illustrated in FIG. 5, has means for implementing the method. In particular, it comprises the flow control point Pcd and a context memory MC. The second context value Lim and/or the first context value $NoSeqData_i$ are read from this memory MC at step 300 illustrated in FIG. 8. The first context value associated with a given connection established across the network 30 is updated in the memory MC whenever a segment passes through the level of the flow control point Pcd on the down link of this connection. FIG. 9 gives a flow chart illustrating the steps of this update procedure. In a step 1000, a TCP data segment, denoted by $Seg_{i,k}$, which is the k-th data segment transmitted by the sender 10 on the down link of the connection of index i, where k is another whole numbed, is received at the level of the flow control point Pcd. In a step 2000, the first context value $NoSeqData_i$ associated with the connection of index i is updated in the context memory MC. To this end, a copy of the segment $Seg_{i,k}$ is de-encapsulated in order to extract its sequence number. The length of the segment is then determined and added to its sequence number and the value obtained is saved as an update of the first context value $NoSeqData_i$. The length of the segment expressed as a number of octets is obtained by subtracting the length of the TCP header (indicated in a field of the TCP segment header as explained above with reference to FIG. 7) from the length of the payload of the IP datagram. This latter length is calculated from the total length of the IP datagram from which the length of its header is subtracted (in turn indicated in the IP data gram header). Finally, in a step 3000, the data segment $Seg_{i,k}$ is transmitted (without modification) on the down link of the connection to the receiver 20.

It should be pointed out that the context memory MC advantageously stores the contexts of each of the TCP connections established across the flow controlled network 30. To this end, the memory MC is indexed by the pair, comprising the source port number and the destination port number defining the connection. The memory capacity of the context memory is dynamically managed. In effect, a control context is created when a new IP connection is detected. A new TCP connection is detected either explicitly, following detection of segments establishing the connection (segments carrying the SYN flag as explained in the introduction) or implicitly when segments belonging to a connection for which no other contexts exist are detected. In order to make these detection procedures possible and create new contexts, a copy of the segments transmitted by the sender is systematically de-encapsulated in order to derive from them in particular the pair comprising.

The source port number and the destination port number, which identify the relevant connection. Similarly, a context is released from the memory, either explicitly when segments terminating the connection (segments carrying the FIN flag) are detected, or implicitly when expiry of an ad hoc time-out is detected. Clearly, the memory space occupied by the context memory proposed by the invention is much smaller than that occupied by a queue Fs known from the prior art and the invention therefore secures a substantial saving in memory space.

To provide an example of the procedures involved in running the method proposed by the invention, we will look at a data stream split into segments of a constant size equal to 100 octets to be transmitted on a TCP connection for which the first context Lim has a value 300 (Lim=300). In other words, the aim is to limit the size of the queue Fs for this connection to 300 octets, i.e. the equivalent of 3 segments.

If we take an instant at which the last segment transmitted by the sender contained octets 401 to 500 of the data stream, the first context value NoSeqData is assigned the value 401+100=501. If the current size of the transmission window is equal to 400(W=400), this means that, from the point of view of the sender, the first segment carrying octets 1 to 100 has been correctly received and acknowledged whereas the second, third, fourth and fifth segments carrying respectively octets 101 to 200, 201 to 300, 301 to 400, 401 to 500 and totalling 400 octets between the four of them have been transmitted but not yet acknowledged. For the purposes of the invention, it is assumed that they are currently being transferred on the down link of the TCP connection.

Let us assume, in a first instance, that the receiver sends an acknowledgement with a sequence number NoSeqAck equal to 201 and notifies a window size of 500. In other words, in this first instance, the receiver has received and acknowledged the second segment and authorised an increase in the window W from 400 to 500 octets. The parameter Diff is then computed by the difference:

$$Diff=NoSeqAck-NoSeqData=501-201=300;$$

As this value is positive, the modified value of the window size notified by the receiver is given by:

$$Wa=Min\ (Lim+Diff,Wa)=Min\ (600,500)=500.$$

Put another way, the window size Wa notified in the acknowledgement is maintained. In other words, the increase in the transmission window W of the connection is accepted. In effect, the method proposed by the invention is based on the assumption that they down link of the connection can absorb 600 octets at best since the network is already absorbing the 300 octets of the third, fourth and fifth segments, which are assumed to still be in the process of being transferred on the down link, and the down link has an additional capacity of 300 octets permitted by the queue Fs.

Let us assume, in a second instance, that the receiver transmits an acknowledgement with a sequence number NoSeqAck equal to 401 and a notified window size of 500 (Wa=500). In other words, in this second instance, the receiver has received and acknowledged the second, third and fourth segments and is authorising an extension of the window W from 400 to 500 octets. The parameter Diff is them calculated by the difference:

$$Diff=NoSeqAck-NoSeqData=501-401=100;$$

Since this value is positive, the modified value of the window size notified by the receiver is given by:

$$Wa=Min\ (Lim+Diff,Wa)=Min\ (400,500)=400.$$

Put another way, the window size Wa notified in the acknowledgement is modified so that it is reduced from 500 to 400 octets. In other words, the increase in the transmission window W of the connection has been refused. In effect, the method proposed by the invention is based on the assumption that the down link of the connection can absorb only 400 octets at best because the network at this point in time can absorb only the 100 octets of the fifth segment which are now the only ones (at most) being transmitted and that the down link has only an additional capacity for 300 octets as permitted by the queue Fs. Allowing the transmission of four new segments would run the risk of causing congestion at the level of the queue Fs, which would cause the maximum value of the capacity of the latter as defined by the second context value Lim to be exceeded.

If we now look at the instant at which the first four segments have been transmitted, the first having been correctly acknowledged, but the acknowledgement corresponding to the second segment (octets 101 to 200) has not been received by the time the associated time-out has expired, the sender has just retransmitted this segment. The first context value NoSeqData is therefore assigned the value 101+100= 201. The second, third, fourth and fifth segments, carrying respectively octets 101 to 200, 201 to 300, 301 to 400, 101 to 200 and totaling 400 octets between the four of them, have been transmitted but not yet acknowledged. Let us assume that the receiver then transmits an acknowledgement with a sequence number NoSeqAck equal to 401 and a notified window size equal to 500. In other words, in this first instance, the receiver has received and acknowledged the second, third, and fourth segments and has authorised an increase in the window W from 400 to 500 octet. The parameter Diff is then calculated by the difference:

Diff NoSeqAck−NoSeqData=201−401=−200;

As this value is negative, it can not correspond to a volume of data passing through the down link of the connection. The modified value of the window size notified by the receiver is given by:

Wa=Min (Lim,Wa)=Min (300,500)=300.

Put another way, the window size Wa notified in the acknowledgement is modified so that it is reduced from 500 to 300 octets. In other words, the increase in the transmission window W of the connection has been rejected and, on the contrary, the window size W is reduced from 400 to 300 because of the new value for the notified widow size Wa obtained in accordance with the invention. In effect, the method proposed by the invention is based on the assumption that the network can not absorb any more data, that only the 300 octets of the queue Fs are available to absorb the data of the window W and that it is therefore necessary to limit the size of the window W to the threshold size Lim of the queue Fs.

It should be pointed out that the mechanism controlling the notified window size proposed by the invention is of advantage because it does not require any explicit indication abort the transmission rate of the connection. Furthermore, it is compatible with the mechanisms used to control the window size at the level of the receiver, such as the slow start, congestion avoidance, fast transmit and fast recovery algorithms.

What is claimed is:

1. Method of controlling a flow of at least one TCP connection between a sender (10) and a receiver (20), of the type which consists in controlling, at a level of a given multiplexing node across which TCP segments pertaining to a connection pass, a parameter for the window size (Wa) contained in the acknowledgement segments returned by the receiver, wherein the method comprises the steps of:

a) receiving (100) an acknowledgement from the receiver on the up link (receiver to sender) of the connection at the level of said given multiplexing node;

b) controlling (200–600) a window size parameter (Wa) contained in said acknowledgement segment on the basis of the difference (Diff) between, firstly, a first context value (NoSegData$_i$) associated with the TCP connection, defined as being the sequence number of the last segment that was transmitted from said given multiplexing node on the down link (sender to receiver) of the connection, to which the length of said segment is added, and, secondly, the sequence number indicated in said acknowledgement segment;

c) transmitting (700) the acknowledgement segment to the sender on the up link of the connection from said multiplexing node with the window size parameter (Wa) thus controlled.

2. Method as claimed in claim 1, wherein the TCP connection is established across a flow controlled network (30).

3. Method as claimed in claim 2, wherein the given multiplexing node is a flow control point (Pcd) of the flow controlled network (30).

4. Method as claimed in claim 3, wherein the flow control point (Pcd) co-operates with a memory which may hold a queue (Fs) associated with the connection, through which data segments transmitted by the sender on the down link of the connection pass, and wherein step c) consists in controlling, on the basis of said difference (Diff), the window size parameter (Wa) present in said acknowledgement segment so as to keep the volume of data stored in the queue (Fs) below a second context value (Lim) associated with the TCP connection.

5. Method as claimed in claim 2, wherein the given multiplexing node is located at an interface of the flow controlled network (30).

6. Method as claimed in claim 4, wherein step b) consists, firstly, in generating (200–400) a control parameter (Diff) equal to said difference between the first context value (NoSegData$_i$) associated with the TCP connection and the sequence number indicated in the acknowledgement section, and, secondly, in controlling (500–600) the window size parameter (Wa) contained in the acknowledgement segment on the basis of the rule:

either Wa=Min(Diff+Lim, WA) if Diff≧0 or Wa=Min(Lim, Wa) if Diff<0 where Wa is said window size parameter,
Diff is said control parameter,
Min is the minimum function,
and Lim is said second context value associated with the connection.

7. Method as claimed in one of the preceding claims, wherein at step b), the second context value and/or the first context value are read from a context memory (MC).

8. Method as claimed in claim 7, wherein the context memory (MC) stores the first and second context values of each of the TCP connections established across the flow controlled network (30).

9. Method as claimed in claim 7, wherein the first context value associated with a given connection is updated in the context memory whenever a data segment is received from the sender at the level of said given node on the down link of this connection.

10. Method as claimed in claim 4, wherein the second context value (Lim) associated with the TCP connection is determined when the TCP connection is established.

11. Method as claimed in claim 10, wherein the second context value (Lim) associated with the TCP connection is determined on the basis of a maximum segment size parameter (MSS) associated with this connection.

12. Method as claimed in claim 11, wherein the second context value. (Lim) associated with the TCP connection is higher than the value of said maximum segment size parameter (MSS) associated with this connection.

13. Method as claimed in claim 3, wherein the flow control point (Pcd) is located as close as possible to the sender (10).

14. Method as claimed in claim 1, wherein steps a) to c) are run in equipment providing an inter-connection between a local network (50) and a flow controlled network (30) across which the TCP connection is established.

15. Method as claimed in claim 1, wherein steps a) to c) are run for each acknowledgement segment received by said given node.

16. Method as claimed in claim 1, wherein at step c), the acknowledgement segment is transmitted immediately.

17. Flow control unit for at least one TCP connection between a sender (10) and a receiver (20), comprising:

means for receiving TCP data segments arriving from the sender (10) and transmitting them to the receiver (20) on a down link (sender to receiver) of the TCP connection and for determining, on a basis of each data segment thus transmitted, a first quantity indicative of the rank, within a data stream transmitted on the down link of the TCP connection, of a first data element to be transmitted to the receiver (20) in a next data segment;

means for receiving TCP acknowledgement segments from the receiver (20) and transmitting them to the sender (10) on the up link (receiver to sender) of the TCP connection and for extracting from each TCP acknowledgement segment received a second quantity indicative of the rank, within said data stream, of a next data element anticipated by the receiver (20); and regulating means for controlling, on the basis of the difference between said first quantity and said second quantity, a window size parameter (Wa) contained in said TCP acknowledgement segment received, before transmitting said TCP acknowledgement segment to the sender (10).

18. Flow control unit as claimed in claim 17, further comprising a memory for holding a queue of data segments received from the sender (10) and to be transmitted to the receiver (20) on the down link of the TCP connection across a flow controlled network (30) and in that the control of said window size parameter (Wa) applied by the regulating means includes limiting said parameter to a value at most equal to the sum of said difference and a maximum size set for the queue in the memory.

19. Inter-connecting equipment (40) between a first network (50) and a second network (30), comprising a flow control unit as claimed in any one of claims 17 or 18.

* * * * *